US 6,663,189 B2

(12) United States Patent
Enomoto et al.

(10) Patent No.: US 6,663,189 B2
(45) Date of Patent: Dec. 16, 2003

(54) GARNISH LIGHT ALLOY WHEEL

(75) Inventors: Tsutomu Enomoto, Toyohashi (JP); Kenji Fukuda, Narashino (JP); Kishiro Abe, Ayase (JP); Masakazu Ohi, Ayase (JP); Kenichi Sakanoshita, Yamato (JP); Koichi Ogiso, Aichi-ken (JP); Tatsuya Ohba, Aichi-ken (JP); Tetuya Miyano, Aichi-ken (JP); Yasunobu Teramoto, Aichi-ken (JP)

(73) Assignees: Topy Kogyo Kabushiki Kaisha, Tokyo (JP); Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/075,440

(22) Filed: Feb. 15, 2002

(65) Prior Publication Data

US 2003/0047987 A1 Mar. 13, 2003

(30) Foreign Application Priority Data

Sep. 13, 2001 (JP) ........................ 2001-277637
Oct. 29, 2001 (JP) ........................ 2001-330564

(51) Int. Cl.[7] ................................................. B60B 7/06
(52) U.S. Cl. ........................ 301/37.36; 301/37.102; 301/37.36; 301/37.41
(58) Field of Search ........................ 301/58, 59, 63.106, 301/64.101, 64.102, 64.203, 64.704, 64.705, 37.101, 37.371, 37.102, 37.41, 64.302, 37.35, 37.36, 37.31, 64.301, 64.305, 64.5, 64.201, 64.202

(56) References Cited

U.S. PATENT DOCUMENTS

| 4,397,504 A | * | 8/1983 | Connell .................... 301/37 P |
| 4,577,909 A | * | 3/1986 | Browning ................ 301/37.35 |
| 4,645,268 A | * | 2/1987 | Carlson ................. 301/37.371 |
| 5,636,906 A | * | 6/1997 | Chase .................... 301/37.43 |
| 5,651,590 A | * | 7/1997 | Word .................... 301/64.201 |
| 5,729,883 A | * | 3/1998 | Yoshioka et al. .......... 29/527.5 |
| 5,803,552 A | * | 9/1998 | Kato et al. ............... 301/37.41 |
| 6,042,194 A | * | 3/2000 | Fitz et al. .................... 301/80 |
| 6,247,760 B1 | * | 6/2001 | Kinoshita ................ 301/37.34 |
| 6,346,159 B1 | * | 2/2002 | Chase et al. .................. 156/79 |
| 6,450,582 B2 | * | 9/2002 | Ichikawa et al. ........ 301/37.36 |

FOREIGN PATENT DOCUMENTS

| GB | 3704384 A | * | 8/1988 |
| JP | 09-226301 | | 9/1997 |

* cited by examiner

Primary Examiner—S. Joseph Morano
Assistant Examiner—Frantz F. Jules
(74) Attorney, Agent, or Firm—Pillsbury Winthrop LLP (57) ABSTRACT

A garnish light alloy wheel includes a light alloy wheel and a garnish. The light alloy wheel includes an outboard surface and a recess located at a portion of the light alloy wheel including a spoke portion. The recess recedes from the outboard surface of the light alloy wheel. The garnish is manufactured separately from the light alloy wheel and is exchangeably mounted to the light alloy wheel at the recess. The light alloy wheel and the garnish construct a design surface of the garnish light alloy wheel, and the garnish has an outboard surface constructing a portion of the design surface of the garnish light alloy wheel.

10 Claims, 6 Drawing Sheets

GARNISH LIGHT ALLOY WHEEL

This application is based on and claims priority from Japanese Patent Application No. 2001-277637, filed on Sep. 13, 2001, and Japanese Patent Application No. 2001-330564, filed on Oct. 29, 2001, the content of which is incorporated herein by reference.

BACKGROUND OF THE INVENTION

1. Field of the Invention

The present invention relates to light alloy wheels and more particularly, relates to a design surface of the wheels.

2. Description of Related Art

Figure 10:
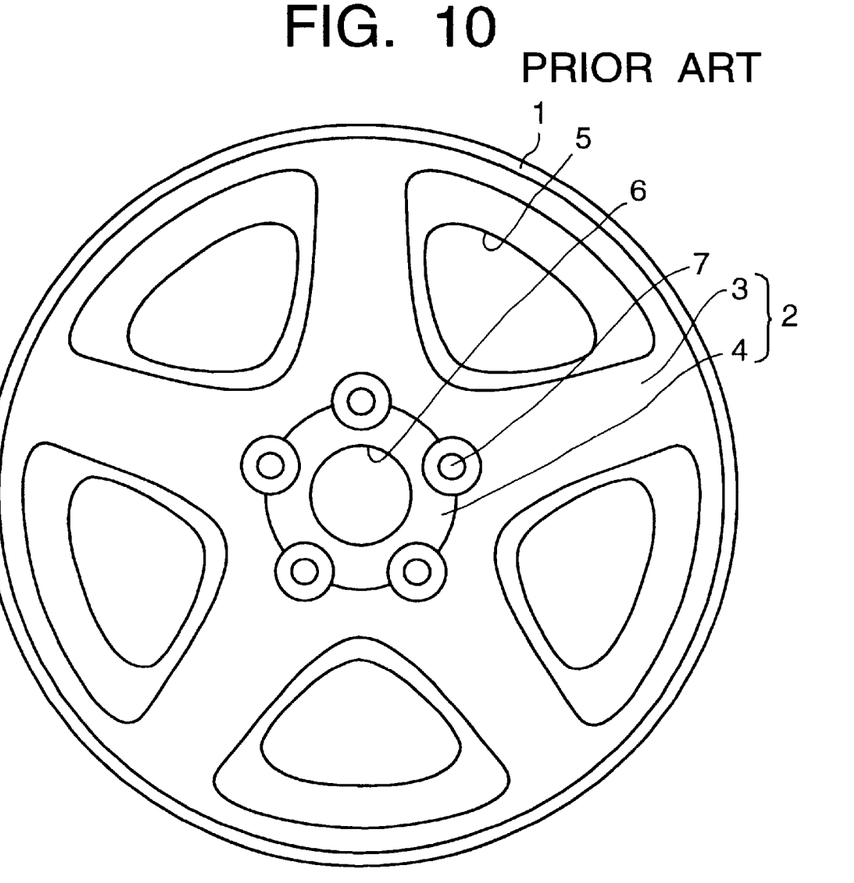
FIG. 10 is a front elevational view of a conventional aluminum wheel.
Figure 11:
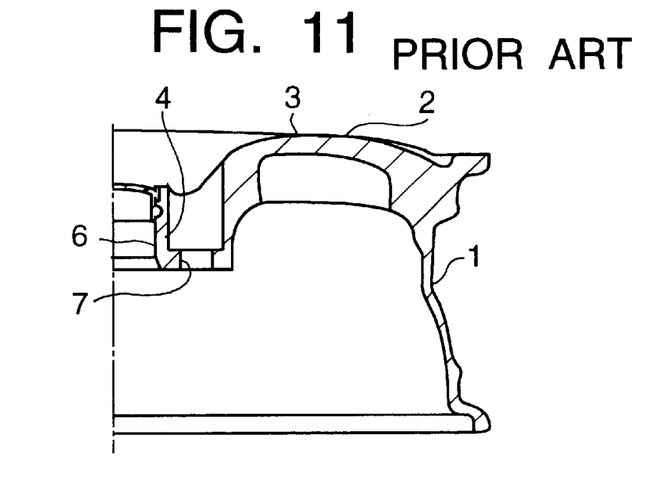
FIG. 11 is a cross-sectional view of a half portion including a spoke portion of the wheel of FIG. 10.

FIGS. 10 and 11 show an aluminum wheel, more particularly, a one piece cast aluminum wheel, that includes a rim portion 1 and a disk portion 2. The disk portion 2 includes a plurality of spoke portions 3 and a central hub portion 4. A decoration hole 5 is formed between adjacent spoke portions 3. In the hub portion 4, a hub hole 6 is formed and a plurality of bolt holes 7 are circumferentially formed surrounding the hub hole 6. An outboard surface of the wheel, which is visible from the outside of a vehicle when the aluminum wheel is mounted to the vehicle, is called as a design surface.

The design surface is machined after casting. However, a design surface having a greater aesthetic appeal than the machined surface is desired.

Conventional methods to improve the design surface exist and such methods include surface treatments, such as color coating, printing, buffing the machined design surface to a brilliant surface, plating via dipping or vacuum deposition, and molding a resin to a groove formed in a wheel. Among these treatments, plating is generally the most effective method.

However, various problems exist in the conventional plating. For example, because the entire design surface is plated, the treated surface becomes a monotonic brilliant surface having a poor uniqueness. Also, the wheel has a considerably large weight, which makes surface treatment difficult. Further, since the wheel has an outer surface including convex positions and concave portions, the surface treatment is generally more difficult and expensive than a surface treatment of a flat surface.

Once a plated design surface is damaged, it is necessary to replace the entire body of the wheel, which can lead to expensive replacement cost.

Generally, recesses can be formed in the wheel to lighten the wheel, but the recesses can degrade the design surface and can make surface treatment of the wheel difficult. Therefore, it can be difficult to lighten a wheel by providing recesses therein.

SUMMARY OF THE INVENTION

An aspect of the present invention is to provide a garnish wheel which can improve the design of the wheel, can decrease the manufacturing cost and can lighten the wheel.

The above aspects can be obtained by providing a garnish light alloy wheel which includes a light alloy wheel and a garnish. The light alloy wheel includes a spoke portion, an outboard surface and a recess located at a portion of the light alloy wheel including the spoke portion. The recess is formed in the outboard surface of the light alloy wheel. The garnish is manufactured separately from the light alloy wheel and is exchangeably mounted in the recess formed in the light alloy wheel. The light alloy wheel and the garnish construct a design surface of the garnish light alloy wheel. The garnish has an outboard surface that constructs a portion of the design surface of the garnish light alloy wheel. In a preferred embodiment, the outboard surface of the garnish can be surface-treated, for example, by one of plating, color-coating and chemical polishing.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 8:
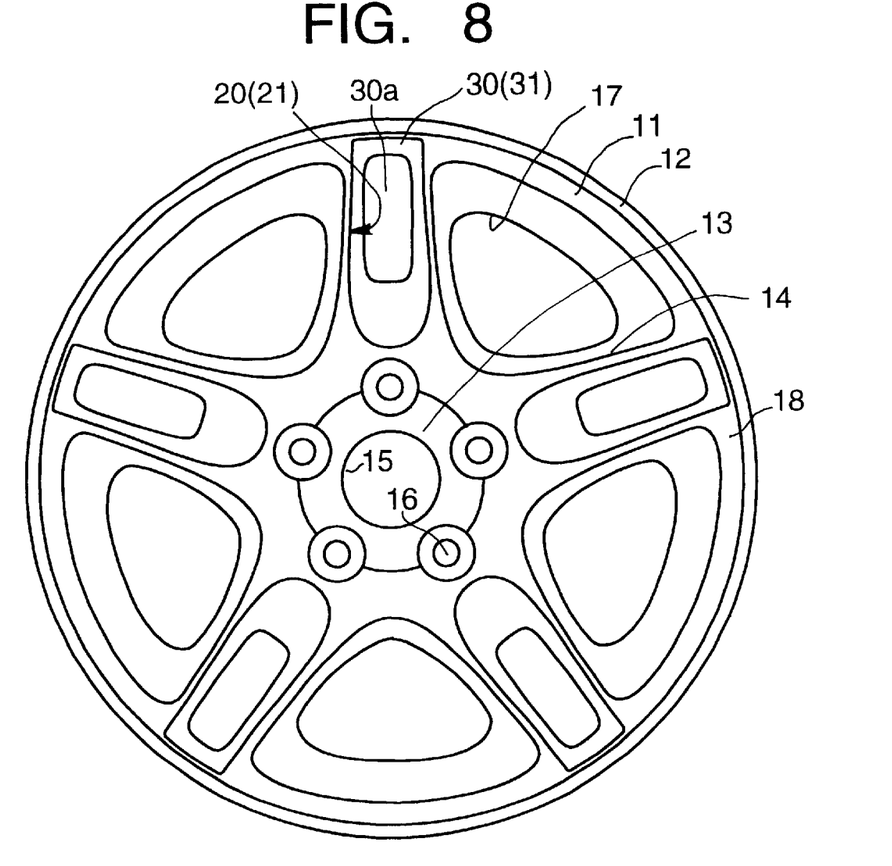
FIG. 8 is a front elevational view of a garnish light alloy wheel according to another embodiment of the present invention.
Figure 9:
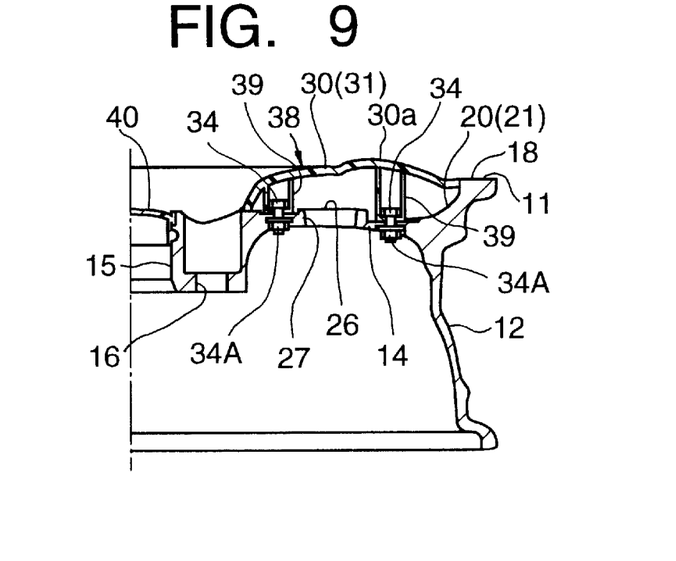
FIG. 9 is a cross-sectional view of a half portion including a spoke portion of the wheel shown in FIG. 8.

A garnish light alloy wheel according to the present invention will be explained with reference to FIGS. 1–9. More particularly, FIGS. 1–7 illustrate a garnish light alloy wheel according to a first embodiment of the present invention, and FIGS. 8 and 9 illustrate a garnish light alloy wheel according to a second embodiment of the present invention. Elements common or similar in the first and second embodiments of the present invention are represented with the same reference numerals.

First, elements common or similar in the first and second embodiments of the present invention will be explained with reference to FIGS. 1–7.

In the description below, an aluminum alloy wheel (hereinafter, aluminum wheel) is an example of the light alloy wheel of the present invention. The light alloy wheel of the present invention is not limited to aluminum wheel, but also includes magnesium wheels, for example.

Figure 1:
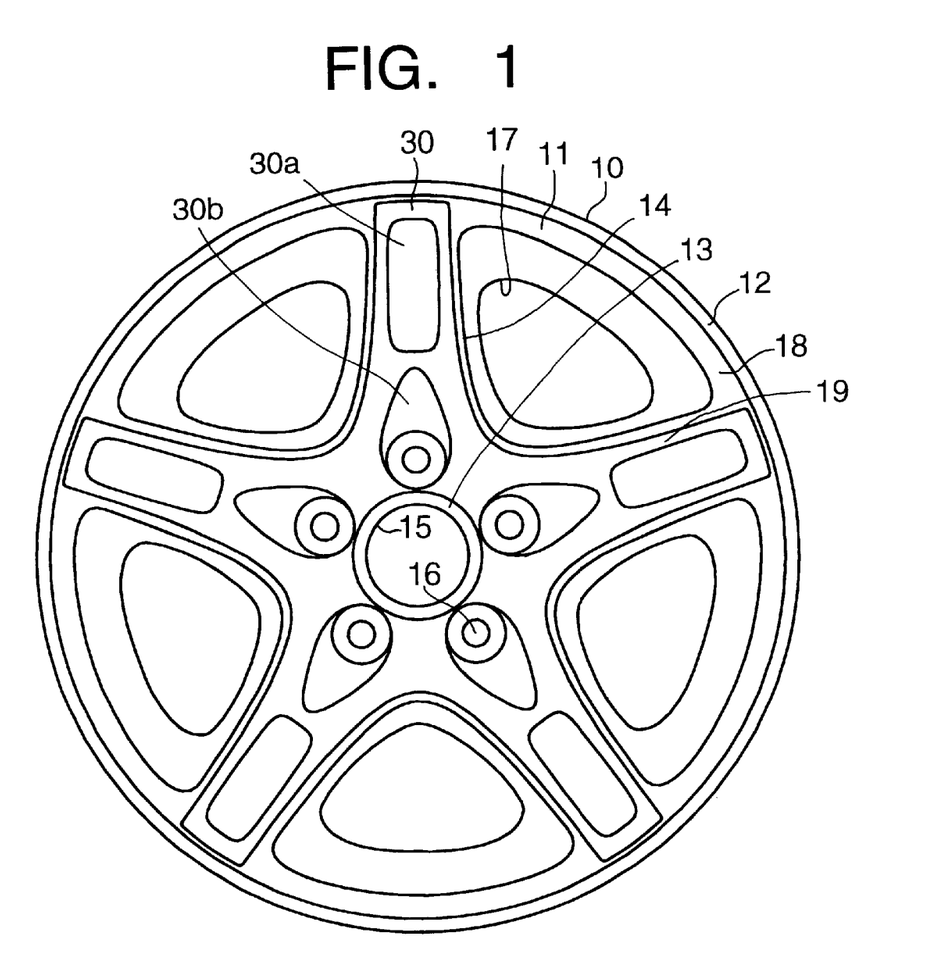
FIG. 1 is a front elevational view of a garnish light alloy wheel according to one embodiment of the present invention.

FIG. 1 shows a garnish aluminum wheel 10 according to the present invention. The garnish aluminum wheel 10 includes an aluminum wheel 11 and a garnish 30. The aluminum wheel 10 may be constructed of a single piece aluminum wheel, but the aluminum wheel is not limited to the single piece wheel and may be constructed of a multi-piece wheel, for example.

Figure 2:
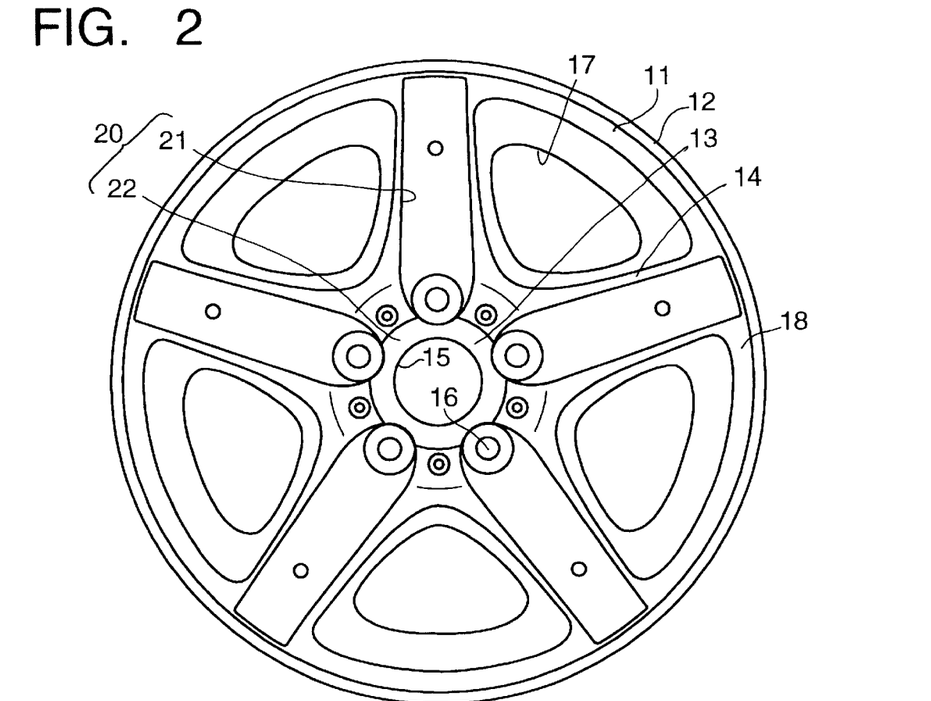
FIG. 2 is a front elevational view of a light alloy wheel of the garnish light alloy wheel shown in FIG. 1.

FIG. 2 best shows the aluminum wheel 11. The aluminum wheel 11 includes a rim portion 12, a hub portion 13, and a plurality of spoke portions 14 that connects the rim portion 12 to the hub portion 13. A single hub hole 15 is formed in the hub portion 13, and a plurality of bolt holes 16 are formed around the hub hole 15 to receive fasteners, such as bolts, therethrough to connect the wheel 11 to an axle shaft of a vehicle. A decoration window 17 is formed between adjacent spoke portions 14. The aluminum wheel 11 has an outboard surface 18 that is visible from outside the vehicle when the aluminum wheel is mounted to the vehicle. The outboard surface 18 of the aluminum wheel 11 constitutes a portion of a design surface 19 of the garnish aluminum wheel 10. The aluminum wheel 11 includes a recess 20 that is formed in a portion of the aluminum wheel including the spoke portion 14. The recess 20 recedes from the outboard surface 18 of the aluminum wheel 10.

The recess 20 can be formed during casting of the aluminum wheel 11 in a case where the aluminum wheel 11 is a cast wheel or can be formed during forging of the aluminum wheel 11 in a case where the aluminum wheel 11 is a forged wheel. Because the recess 20 is formed during casting or forging of the aluminum wheel 11, no machining is necessary for formation of the recess 20. Therefore, no additional manufacturing costs are required.

Figure 3:
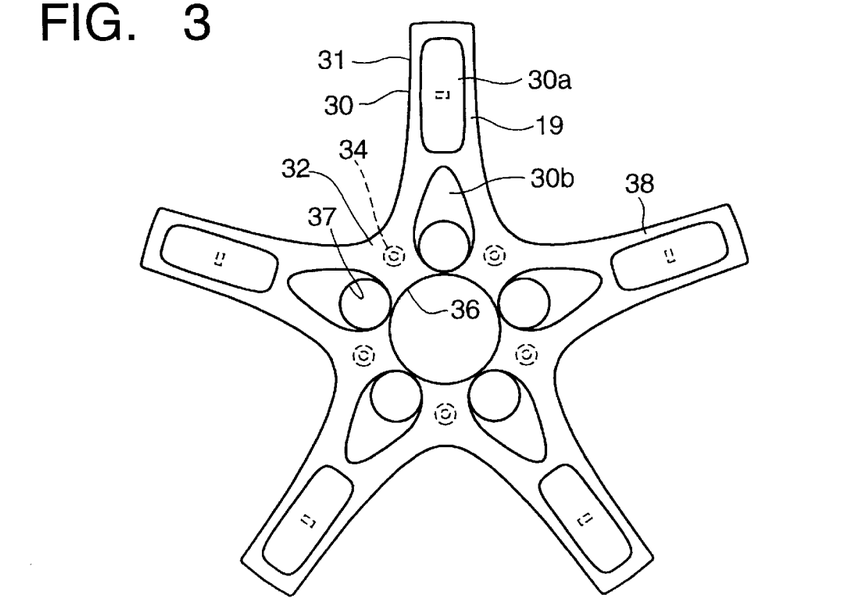
FIG. 3 is a front elevational view of a garnish of the garnish light alloy wheel shown in FIG. 1.

FIG. 3 best shows the garnish 30. The garnish 30 is manufactured separately from the aluminum wheel 11 and is separately and exchangeably mounted in the recess 20 of the aluminum wheel 11. The aluminum wheel 11 and the garnish 30 cooperate with each other to constitute the design surface 19. The garnish 30 has an outboard surface that constructs a portion of the design surface 19 of the garnish aluminum wheel 10.

At least the outboard surface of the garnish 30 is surface-treated, for example, by one of plating, color-coating and chemical polishing to construct a surface-treated surface 38. Other surface treating methods could be used as well. The entire surface of the garnish 30 (the outboard surface and the inboard surface of the garnish 30) may be surface-treated. The plating is, for example, a chrome plating, or a pastel-yellow-colored plating, or a gold plating (including a gold-colored plating), or an aluminum plating, or an aluminum alloy plating, or a metal plating plated onto a coated surface. The color-coating includes, for example, a plating-tone coating.

Preferably, a body of the garnish 30 is made from synthetic resin, because the garnish 30 made from synthetic resin is light and can be easily formed to a desired configuration so that the design of the wheel can be easily improved. For example, by forming a convex portion 30a and concave portion 30b in a spoke garnishing portion 31 of the garnish 30, the design of the wheel is improved and can be made more aesthetically appealing. Due to the synthetic resin structure, the convex and concave portions 30a, 30b are easily formed in the garnish 30. The material of the garnish 30 is not limited to synthetic resin and metal plate may be used, for example.

The recess 20 of the aluminum wheel 11 includes a bottom surface 26. The depth of the recess 20 is greater than that of a portion of the garnish 30 constructing the design surface 19. Preferably, a space is formed between the bottom surface 26 of the recess 20 and the portion of the garnish 30 constructing the design surface 19. Due to the space formed between the bottom surface 26 of the recess 20 and the garnish 30, the aluminum wheel 11 can be lightened.

An opening 27 is formed in the bottom surface 26 of the recess 20. Therefore, the space formed between the bottom surface 26 of the recess 20 and the portion of the garnish 30 constructing the design surface 19 is open at the opening 27. Water can be exhausted from the space through the opening 27, if, for example, water enters the space. As a result, no rotational imbalance due to the water in the space will occur.

The aluminum wheel 11 and the garnish 30 are separately coupled to each other at a radially inner portion and/or a radially outer portion of the garnish 30 by at least one of first and second coupling devices. The first coupling device includes a bolt 34 coupled to the garnish 30 and extends through a bolt-hole 24 formed in the aluminum wheel 11 and a nut 34A threaded to the bolt 34. The second coupling device includes a hook 35 formed to the garnish 30 and engages the aluminum wheel 11 at an engage portion 25 of the aluminum wheel 11.

Figure 4:
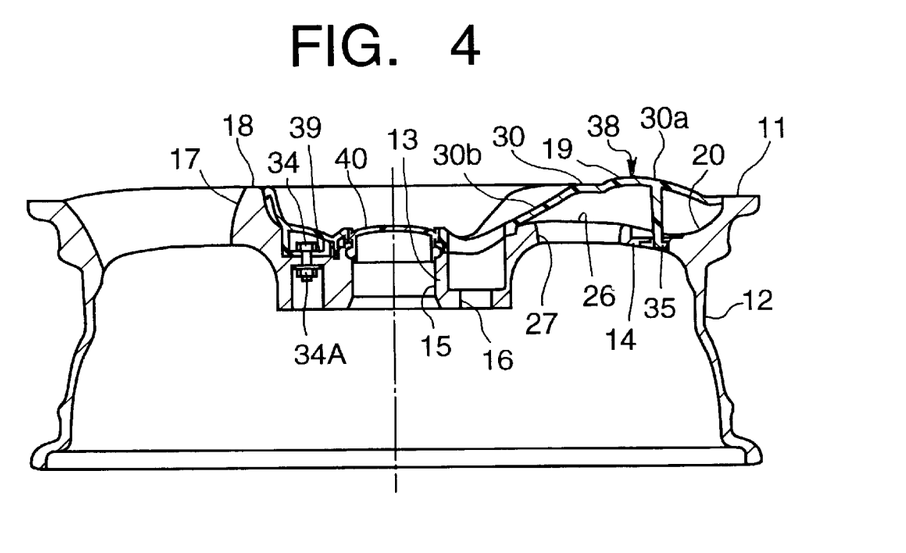
FIG. 4 is a cross-sectional view of the garnish light alloy wheel shown in FIG. 1, wherein the garnish is coupled to the light alloy wheel by two kinds of coupling devices.

The garnish 30 can be coupled to the aluminum wheel 11 by any one of the following coupling ways: More particularly, FIG. 4 illustrates the first coupling device being used to couple the garnish 30 with the wheel 11 at the radially inner portion of the garnish 30 and the second coupling device being used to couple the garnish 30 with the wheel 11 at the radially outer portion of the garnish 30. In an alternative embodiment, not shown, the second coupling device may be used to couple the garnish 30 with the wheel 11 at the radially inner portion of the garnish 30 and the first coupling device may be used to couple the garnish 30 with the wheel 11 at the radially outer portion of the garnish 30.

Figure 5:
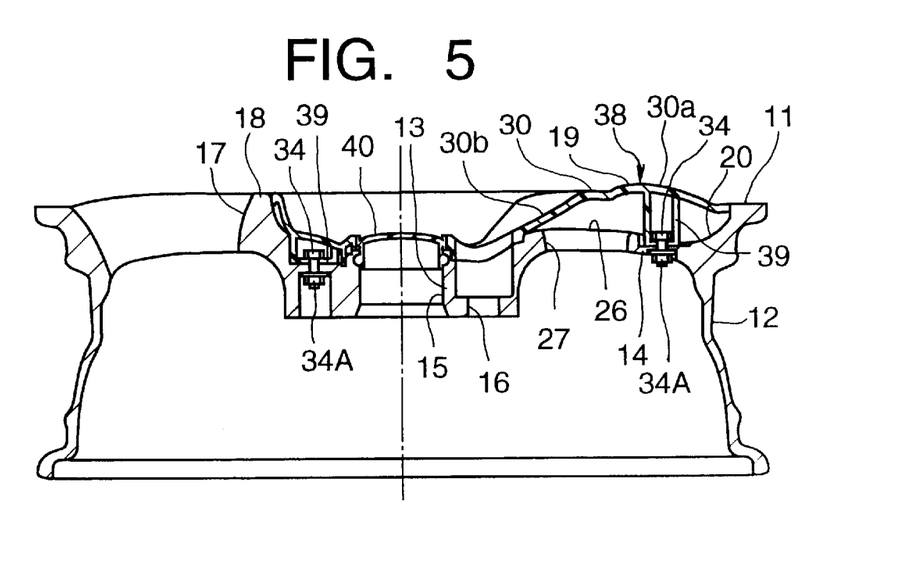
FIG. 5 is a cross-sectional view of the garnish light alloy wheel shown in FIG. 1, wherein the garnish is coupled to the light alloy wheel by one kind of coupling device.
Figure 6:
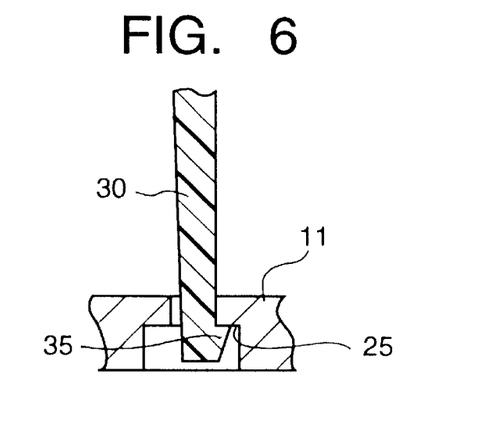
FIG. 6 is an enlarged, partial cross-sectional view of the area showing one of the kinds of coupling devices having a hook shown in FIG. 4 clearly.

FIG. 5 illustrates the first coupling device being used to couple the garnish 30 with the wheel 11 at the radially inner portion and the radially outer portion of the garnish 30. In an alternative embodiment, not shown, the second coupling device may be used to couple the garnish 30 with the wheel 11 at the radially inner and outer portions of the garnish 30.

Figure 7:
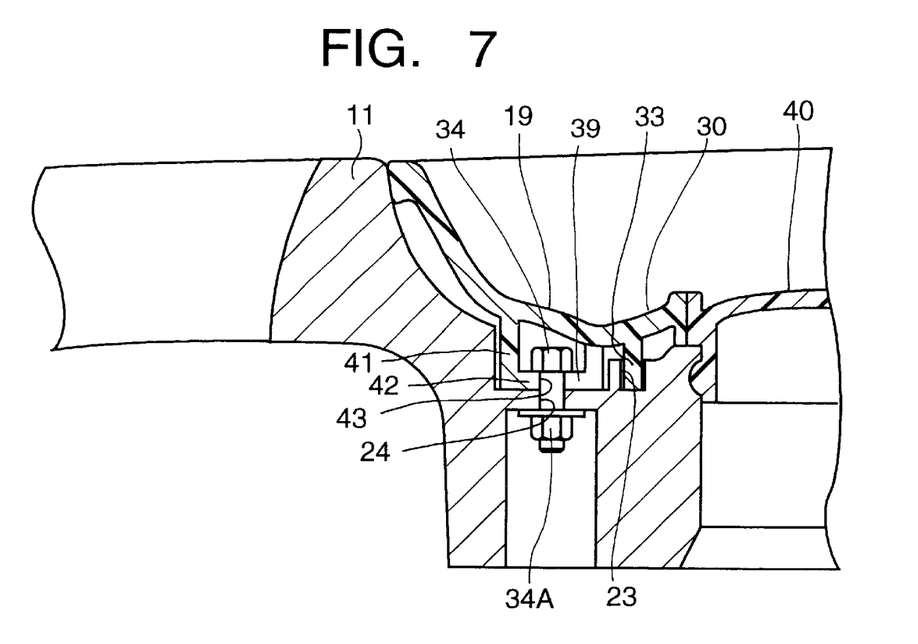
FIG. 7 is a partial cross-sectional view, of the area showing the other of the two kinds of coupling devices having a bolt and a nut shown in FIG. 4.

In the first coupling device, as shown in FIGS. 5 and 7, the coupling structure of the bolt 34 with the garnish 30 may take, for example, any one of the following first and second structures. In the first structure, the garnish 30 includes a hollow cylindrical portion 41 formed behind and protruding inboardly from the outboard surface of the garnish 30. At an end of the hollow cylindrical portion 41, an end plate 42 is formed, and a bolt hole 43 is formed in the end plate 42. The bolt hole 43 is open laterally, in a direction perpendicular to an axis of the bolt hole 43, by a slit 39 formed in the hollow cylindrical portion 41 and the end plate 42. The bolt 34 is inserted laterally to the bolt hole 43 through the slit 39. In the second structure, the garnish 30 includes a hollow cylindrical portion formed behind and protruding inboardly from the outboard surface of the garnish 30. The bolt 34 is constructed of a stud bolt. A threaded portion of the stud bolt is threaded into and engaged with an inside surface of the hollow cylindrical portion of the garnish 30.

Each of the bolt and nut 34, 34A, and the hook 35 is located behind the outboard surface of the garnish 30 and is not exposed to the design surface of the garnish 30. Because the bolt 34 and the hook 35 are located behind the design surface, the design of the wheel is not affected and can be well maintained.

The first and second coupling devices are not limited to the bolt and nut 34, 34A, and the hook 35 shown in FIGS. 4–7. For example, either one of the first and second coupling devices or both of the first and second coupling devices may include an adhesive such as a double coated tape. The adhesive could be provided at a portion other than the space between the garnish 30 and the bottom surface 26 of the recess 20 of the aluminum wheel 11.

As shown in FIG. 7, the aluminum wheel 11 includes a slit 23, and the garnish 30 includes a rib 33 formed at a portion of the garnish that corresponds to the slit 23. The rib 33 is inserted into the slit 23. The rib 33 and the slit 23 extend in the direction perpendicular to a radial direction of the wheel 11 to provide a dislocation preventing mechanism, which prevents the garnish 30 from being dislocated relative to the aluminum wheel 11. A dislocation preventing mechanism including the rib 33 and the slit 23 is not necessary to practice the invention in its broadest aspects.

Technical advantages according to the above elements common or similar in the first and second embodiments will be explained.

Since the garnish 30 is manufactured separately from the aluminum wheel 11 and is separately mounted to the aluminum wheel 11 at the recess 20, the design surface 19 becomes non-monotonic and generates a unique design when only the garnish 30 is decorated.

Since only the garnish 30 is surface-treated, surface-treatment is simplified because the garnish 30 is lighter than the aluminum wheel 11. As a result, surface treatment of the garnish 30 is generally more cost-effective than surface treatment of conventional wheels.

By only surface-treating the garnish 30, the surface-treated area can be reduced as compared with conventional wheels where the entire design surface of a conventional wheel is surface-treated to a brilliant surface.

In situations where the garnish 30 is or becomes damaged, the design surface 19 can be renewed by only exchanging the damaged garnish 30. Therefore, a new wheel is not needed when the garnish 30 becomes damaged, which reduces replacement cost.

Further, because the recess 20 is covered with the garnish 30, the wheel can be lightened to a large amount by removing a relatively large amount of material from the wheel at the recess 20 without degrading the design.

Because the aluminum wheel 11 and the garnish 30 are removably coupled to each other at a plurality of positions by a plurality of the first and/or second coupling devices, the garnish 30 will continue to be reliably coupled to the aluminum wheel 11, even if the wheel 11 is given any mechanical shock.

Next, structures and technical advantages unique to each embodiment of the present will be explained below.

With the first embodiment of the present invention, as illustrated in FIGS. 1–7, the recess 20 includes a circumferential groove 22 formed in a radially outer portion of a hub portion 13 of the aluminum wheel 11, and a plurality of radial grooves 21 each formed in each of the spoke portions 14 of the aluminum wheel 11.

The garnish 30 is formed in a single piece, and includes a plurality of spoke garnishing portions 31 and a single connecting portion 32 extending circumferentially and connecting the plurality of spoke garnishing portions 31. The bolt and nut portion 34, 34A is located between the bolt holes 37 and in the connecting portion 32.

A width of the spoke garnishing portion 31 is smaller than a width of the spoke portion 14 of the aluminum wheel 11. The spoke portion of the design surface 19 includes the spoke garnishing portion 31, which is located at a central portion of the spoke portion in the width direction thereof. The spoke portion 14 of the aluminum wheel 11 is located on both sides of the spoke garnishing portion 31. Due to this structure, the design surface 19 is able to provide a unique design.

A hub hole 36 is formed in the connecting portion 32 of the garnish 30 and a plurality of bolt holes 37 are formed around the hub hole 36 for inserting a hub bolt therethrough. When the garnish aluminum wheel 10 is mounted to the vehicle, the hub bolt may be visible through the bolt holes 37.

The outboard surface of the garnish 30 is the surface-treated surface 38. When the garnish aluminum wheel 10 is mounted to the vehicle, an ornament 40 can be mounted at the hub hole 36, to provide the wheel 10 with more aesthetic appeal, for example.

Since the recess 20 includes a single recess including a plurality of grooves connected to each other and the garnish 30 includes a single piece, even if one of the plurality of coupling devices is loosened, the garnish 30 can continue to be coupled to the aluminum wheel, which provides a high reliability in the coupling.

With the second embodiment of the present invention, as illustrated in FIGS. 8 and 9, the recess 20 includes a plurality of radial grooves 21 each formed in each of the spokes 14 of the aluminum wheel 11 and separate from each other. The recess 20 does not include a circumferential groove 22, as described in relation to FIGS. 1–7.

The garnish 30 includes a plurality of pieces 31 separate from each other, but does not include a connecting portion 32.

Since the recess 20 includes a plurality of radial grooves 21 each formed in each of the spokes 14 of the aluminum wheel 11 and the garnish 30 includes a plurality of pieces 31 separate from each other, even if a portion of the plurality of pieces 31 is damaged, the wheel can be replaced or renewed by exchanging the damaged pieces only.

The foregoing description of the embodiments of the present invention provides illustration and description, but is not intended to be exhaustive or to limit the invention to the precise form disclosed. Modifications and variations are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined the above illustration and description as well as by the attached claims and their equivalents.

What is claimed is:

1. A wheel comprising:
    a light alloy wheel including a plurality of spoke portions, said light alloy wheel having an outboard surface and a recess located at an area of said light alloy wheel including said plurality of spoke portions, said recess receding from said outboard surface of said light alloy wheel; and
    a garnish manufactured separately from said light alloy wheel and exchangeably mounted to said light alloy wheel at said recess, said light alloy wheel outboard surface and said garnish constructing a design surface of said wheel, said garnish having an outboard surface constructing a portion of said design surface of said wheel, wherein said light alloy wheel and said garnish are removably coupled to each other by a coupling device including at least one of (1) a bolt coupled to said garnish and extending through a bolt-hole formed in said light alloy wheel and a nut threaded to said bolt, and (2) a hook formed to said garnish engaging said light alloy wheel, and wherein at least one of said bolt and said hook is located behind said design surface.

2. A wheel according to claim 1, wherein said outboard surface of said garnish is surface-treated by one of plating, color-coating and chemical polishing.

3. A wheel according to claim 1, wherein said garnish includes a synthetic resin body, an outboard surface of which is surface-treated.

4. A wheel according to claim 1, wherein said recess of said light alloy wheel has a bottom surface, between said bottom surface of said recess and said garnish a space for lightening said light alloy wheel being formed.

5. A wheel according to claim 4, wherein an opening is formed at said bottom surface of said recess of said light alloy wheel.

6. A wheel according to claim 1, wherein said light alloy wheel is a cast wheel, said recess being formed during casting of said light alloy wheel.

7. A wheel according to claim 1, wherein said light alloy wheel is a forged wheel, said recess being formed during forging of said light alloy wheel.

8. A wheel according to claim 1, wherein said light alloy wheel has a slit and said garnish has a rib, said rib being inserted into said slit and engaging said light alloy wheel at said slit in a radial direction of said wheel.

9. A wheel according to claim 1, wherein said recess includes a circumferential groove formed in a radially outer portion of a hub portion of said light alloy wheel and a plurality of radial grooves, one formed in each of said plurality of spokes of said light alloy wheel, respectively, and communicating with said circumferential groove, and said garnish is formed in a single piece and includes a plurality of spoke garnishing portions and a single connecting portion extending circumferentially and connecting said plurality of spoke garnishing portions.

10. A wheel according to claim 1, wherein said recess includes a plurality of radial grooves each formed in each of said plurality of spokes of said light alloy wheel and separate from each other, and said garnish includes a plurality of pieces separate from each other.

* * * * *